UNITED STATES PATENT OFFICE.

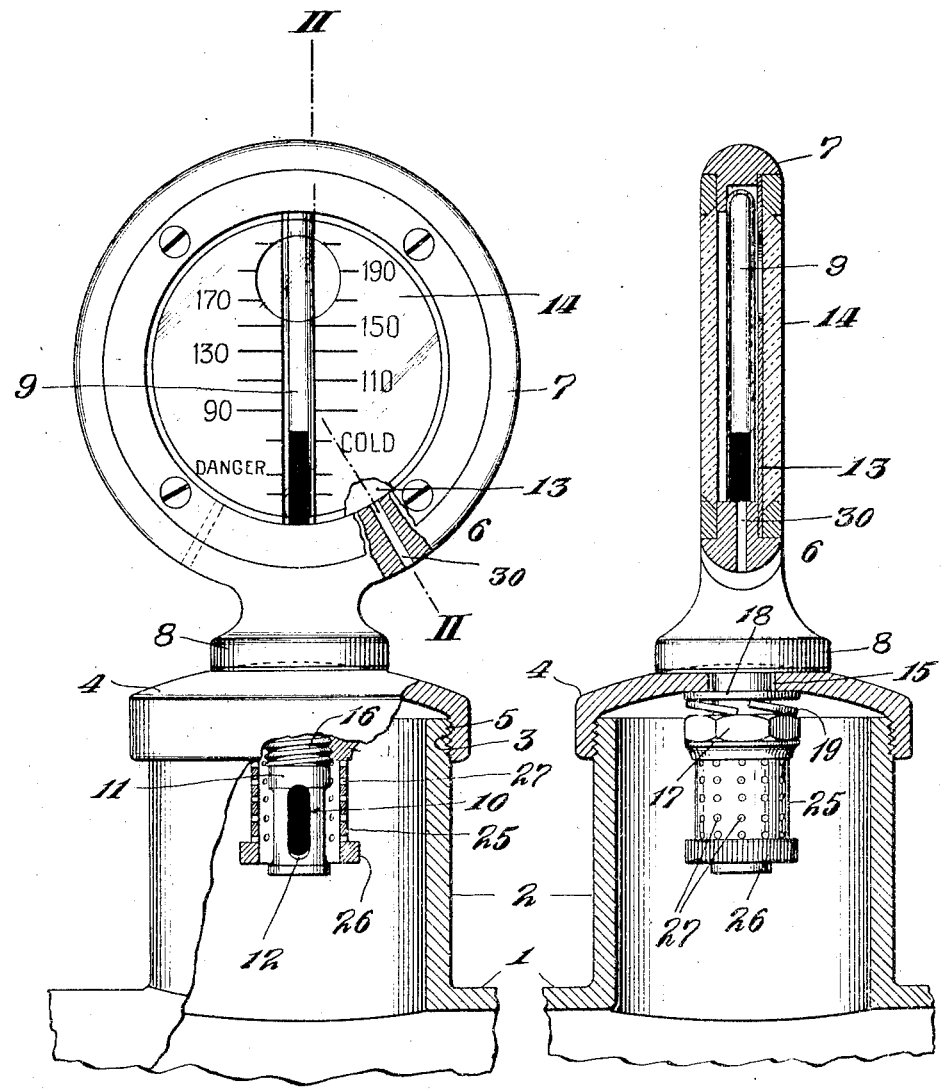

HARRISON H. BOYCE, OF FOREST HILLS, NEW YORK.

INDICATING INSTRUMENT FOR AUTOMOBILE-RADIATORS.

1,272,367.   Specification of Letters Patent.   Patented July 16, 1918.

Original application filed June 20, 1914, Serial No. 846,247. Divided and this application filed April 5, 1917. Serial No. 159,906.

*To all whom it may concern:*

Be it known that I, HARRISON HURLBERT BOYCE, a citizen of the United States, and a resident of Forest Hills, county of Queens, and State of New York, have invented certain new and useful Improvements in Indicating Instruments for Automobile-Radiators, of which the following is a specification.

This invention relates to instruments for indicating the condition of the engines or radiators of automobiles or other vehicles provided with a radiator forming a part of the engine cooling system and comprises certain features of construction which will be hereinafter fully set forth.

An important object of the invention is the provision of means for attachment of the instrument to the filler cap of the radiator, whereby the instrument may be correctly positioned. In most automobiles, the radiator is provided at the top with a projecting filler spout which is threaded at the upper end and which is adapted to be closed by a filler cap properly threaded for engagement with threads of the filler spout. A desirable place for the attachment of the indicating instrument is to mount it on this filler cap. It is objectionable, however, to secure the instrument fixedly to the filler cap for the reason that it is frequently difficult, if not impossible, to rotate the cap when screwing it to the filler spout always to the same angular position with relation to the radiator. If the instrument were rigidly mounted on the cap, therefore, it will be seen that it would not always be brought to the proper angular position in alinement with the radiator and with its face turned squarely in the direction of the driver's seat but it would on the contrary frequently occupy an oblique and unsymmetrical position where it would detract from the appearance of the automobile and would frequently be difficult to read from the driver's seat. In some cases in fact its reading would be impossible. At the same time it is absolutely necessary to mount the instrument firmly and securely so as to enable it to withstand the severe vibrations to which it is subject by the action of the engine and the movements of the vehicle and to prevent the possibility of its working loose, rattling or becoming detached or injured.

The present invention overcomes these difficulties by providing for a firm connection between the instrument and the filler cap which, however, is of such a nature as to permit a relative turning movement between the two. In this way the cap may be screwed up tightly irrespective of the angular position of the instrument and the instrument may then be oriented with respect to the plane of the radiator or axis of the automobile so as to cause it to occupy the correct position for appearance and observation.

Another object of the invention relates to the provision of means for effectually protecting the bulb of the instrument during and after the attachment of the same to the filler cap.

In the accompanying drawing forming a part of this specification in which is illustrated one preferred embodiment of the invention, Figure 1 is a face view of the instrument mounted upon the screw filler cap of a vehicle radiator, parts being shown in vertical section.

Fig. 2 is a vertical section through the instrument, filler cap and filler spout, the plane of section through the body of the instrument being indicated by line II—II in Fig. 1.

Referring to the drawings in detail, the numeral 1 designates the upper part of a radiator, such as an automobile radiator, which is provided with the filler spout 2. The latter is shown as screw-threaded as at 3. This spout is adapted to be tightly closed in the usual manner by a removable cap 4 having the internal screw threads 5. The instrument 6 is shown as of the general form illustrated in my Patent No. 1,090,776, dated March 17th, 1914, and comprises an annular body portion or frame 7 having a base 8 which is adapted to rest on the upper surface of the filler cap. The body portion or frame carries a thermometer tube 9 preferably mounted vertically and which projects through an opening (not shown) in the base of the instrument, the bulb 10 at the lower end of the tube being located a suitable distance below the base 8. The downwardly projecting part of the tube and bulb are preferably protected by a hollow stem 11, which is provided with openings 12 so as to permit the bulb to be influenced by surrounding temperatures. The instrument is so constructed that the upper portion of the tube 9 is visible so that temperature indications may be observed by the driver of the vehicle, this portion of the tube being preferably associated with a suitably inscribed dial plate 13, the tube and dial plate, in the form of the invention illustrated, being inclosed between glass crystals 14.

To attach the instrument to the filler cap, the latter is formed with an opening 15 through which the stem 11 passes with sufficient freedom to permit relative rotation between the instrument and the cap. Means for engagement with the under surface of the cap are provided for maintaining the instrument upon the same. As illustrated the stem is provided with a screw thread 16 on which is screwed a nut 17 which acts through the interposed washers 18 and 19 against the underside of the cap. One of these washers is preferably of a yielding character so as to permit of a tight but not immovable connection between the instrument and the filler cap. As illustrated the washer 19 is shown as a split spring washer for this purpose. It will be seen that with this construction the nut 17 may be screwed up so as to clamp the instrument firmly to the filler cap thereby preventing leakage, rattling or any objectionable movement. At the same time, the connection between the instrument and the filler cap is a frictional rather than a positive one and permits the turning of the instrument independently of the filler cap. It is thus possible to screw the filler cap firmly in position upon the filler spout without regard to its final angular position and then turn the instrument upon the filler cap until it is properly located. This capability is an important one in the practical use of a device of this character mounted upon a filler cap as it is not possible always to bring the filler cap to the same position upon the filler spout. For instance, the threads on the filler cap and spout may become worn thus permitting the cap to turn further before seating than it did originally. If the instrument were fixedly mounted on the cap this would result in its being turned out of its proper alined position. This could only be corrected by turning the cap part way up, which would be objectionable in rendering the cap liable to work loose and in permitting leakage around the cap. With my construction the cap may always be turned until it fits tightly on the spout without regard to the position of the instrument, after which the latter may be corrected.

Another feature of my invention relates to means for protecting the bulb and downwardly projecting part of the thermometer tube or other downwardly projecting part of the instrument against breakage. In accordance with this part of the invention I provide a sleeve 25 preferably long enough to extend approximately to the bottom of the thermometer bulb and which in the particular embodiment of the invention shown, forms an extension of the nut 17. This sleeve serves to prevent the wrench employed to screw up the nut when attaching the instrument from striking and injuring the bulb or stem. The sleeve also makes an additional protection for the bulb when the instrument and cap are removed, as in filling the radiator. The sleeve is preferably knurled at the lower end, as indicated at 26, in which case it provides a convenient means for screwing up the nut without reaching up into the cap. As shown, the sleeve is provided with perforations 27, so as to permit the full action of the temperature upon the bulb.

The numeral 30 designates an opening extending through the casing of the instrument for ventilating the interior thereof so as to prevent condensation of moisture on the crystals.

While I have described in detail but one preferred embodiment of my invention, this is to be understood merely as illustrative thereof, and it will be understood that my invention may be embodied in various structures. The different features of my invention need not be employed in one construction, but may be separately utilized if desired.

This application is a division of my application, Serial No. 846,247, filed June 20th, 1914.

Having thus described my invention, I claim:

1. In indicating means for the radiators of vehicle propelling motors, the combination with a radiator having a filler opening, a closure member for said opening having a hole therethrough and connections for said closure member whereby said member may be drawn tight by a turning movement, of an instrument for indicating thermal conditions within the radiator having a visible indicating portion exterior to said closure member and a portion adapted to be influenced by conditions within the radiator and projecting through the hole in said closure member, and yielding clamping means for frictionally and rotatably but firmly and tightly clamping said instrument to said closure member.

2. In indicating instruments for the radiators of vehicle propelling motors, the combination with a radiator filler spout having a screw threaded upper end and a cap for closing said filler spout and threaded to engage the threads of said spout, said cap having an opening through it, of an instrument for indicating thermal conditions inside the radiator comprising a frame with a base adapted to rest on top of said cap, said instrument having a stem adapted to project through the opening in said cap, and means engaging the underside of said cap and said stem for clamping the cap frictionally between said means and said base, said instrument being capable of rotation on said cap so as to permit the position of the instrument to be corrected after the cap has been screwed upon the filler spout.

3. In indicating instruments for the radiators of vehicle propelling motors, the combination with a screw threaded filler spout and a screw threaded cap adapted to screw on said spout and close the same, said cap having a hole therethrough, of an instrument for indicating thermal conditions inside the radiator having a frame provided with a base adapted to rest on said cap and a screw threaded stem projecting freely through the hole, and means for adjustably and frictionally securing said instrument to said cap, said means including a nut screwing on said stem beneath said cap, whereby the position of the instrument may be adjusted by turning the same with relation to the cap, after the cap has been screwed upon the filler spout.

4. In indicating instruments for radiators of vehicle propelling motors, the combination with a radiator filler spout and a cap adapted to close the spout and to be engaged with said spout for rotary movement, said cap having a hole therethrough, of an instrument for indicating thermal conditions inside the radiator, comprising a frame having a base adapted to rest on said cap and having a stem projecting freely through said hole, said stem being exteriorly screw threaded, a nut screwing on said stem inside of the cap, yielding means interposed between said nut and the inside of said cap whereby the cap is yieldingly but firmly clamped between the instrument base and said nut, and temperature responsive indicating means carried by said instrument, part of said means being exposed to view in the frame of the instrument and a part of the same projecting through the base and stem of the instrument to a position below the cap.

5. In indicating means for the radiators of vehicle propelling motors, the combination with a radiator having a filler opening and a cap therefor, and connections for the cap whereby the cap may be drawn tight by a turning movement, said cap having a hole therethrough, of an indicating instrument comprising a frame having a stem projecting through the hole in said cap, a glass tube thermometer carried by said frame and having its bulbed end extending into said stem, and yielding clamping means for frictionally and rotatably but firmly and tightly clamping said instrument to said cap.

6. In an instrument of the character described, the combination of a frame having a base adapted to seat upon a radiator cap having a hole therethrough and a stem adapted to project through the hole in said cap, temperature responsive indicating means carried by said frame and including a depending fragile portion and means for clamping said instrument to said cap including a portion adapted to be screwed on said stem and provided with a protective sleeve adapted to surround said depending fragile portion.

7. In an instrument of the character described, the combination of a frame having a base adapted to seat upon a radiator cap having a hole therethrough and a stem adapted to project through the hole in said cap, a glass tube thermometer mounted in said frame and having its bulbed end extending through said stem, said stem having a screw-threaded portion and a protective sleeve adapted to be screwed on said stem below said cap and to surround and protect the thermometer bulb, said sleeve being provided with perforations.

8. In an instrument of the character described, the combination of a frame having a base adapted to rest upon a radiator cap and having a downwardly projecting screw threaded stem, a glass tube mounted in said frame and having a portion projecting through said stem, and a combined clamping nut and protective sleeve adapted to screw on said stem to clamp said instrument to a radiator cap, said sleeve having a faceted head at the upper end thereof and a knurled portion at the lower end thereof and being provided with a series of perforations between said head and knurled portion.

HARRISON H. BOYCE.